(12) United States Patent
Rink et al.

(10) Patent No.: US 6,652,683 B2
(45) Date of Patent: Nov. 25, 2003

(54) ELEMENTAL CARBON IN INFLATION GAS GENERATION

(75) Inventors: Karl K. Rink, Liberty, UT (US); Matthew S. Johnson, Salt Lake City, UT (US); David J. Green, Brigham City, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 09/932,855

(22) Filed: Aug. 17, 2001

(65) Prior Publication Data

US 2002/0148544 A1 Oct. 17, 2002

Related U.S. Application Data

(63) Continuation-in-part of application No. 09/836,514, filed on Apr. 17, 2001.

(51) Int. Cl.[7] ............................. C06B 31/00; C06D 5/00; B60R 21/26
(52) U.S. Cl. .................. 149/46; 102/531; 280/737; 280/741
(58) Field of Search ........................ 149/45; 280/736, 280/737, 741; 102/531

(56) References Cited

U.S. PATENT DOCUMENTS

| 2,904,420 A | | 9/1959 | Holker | |
|---|---|---|---|---|
| 5,348,344 A | | 9/1994 | Blumenthal et al. | |
| 5,649,720 A | * | 7/1997 | Rink et al. | 280/737 |
| 5,669,629 A | | 9/1997 | Rink | |
| 5,847,315 A | | 12/1998 | Katzakian, Jr. et al. | |
| 5,884,938 A | | 3/1999 | Rink et al. | |
| 5,941,562 A | | 8/1999 | Rink et al. | |
| 6,098,548 A | * | 8/2000 | Rink et al. | 102/531 |
| 6,149,191 A | * | 11/2000 | Rink | 280/736 |
| 6,244,623 B1 | | 6/2001 | Moore et al. | |

* cited by examiner

*Primary Examiner*—Michael J. Carone
*Assistant Examiner*—Aileen B. Felton
(74) *Attorney, Agent, or Firm*—Sally J. Brown; James D. Erickson

(57) ABSTRACT

Inflation apparatuses and methods are provided which utilize elemental carbon and nitrous oxide in the gas generation or formation process.

20 Claims, 3 Drawing Sheets

ELEMENTAL CARBON IN INFLATION GAS GENERATION

CROSS REFERENCE TO RELATED APPLICATION

This application is a continuation-in-part application of application, U.S. patent application Ser. No. 09/836,514, filed on Apr. 17, 2001. The co-pending parent application is hereby incorporated by reference herein and is made a part hereof, including but not limited to those portions which specifically appear hereinafter.

BACKGROUND OF THE INVENTION

This invention relates generally to gas generation and, more particularly, to devices and methods for inflating an inflatable device such as an inflatable vehicle occupant restraint of a respective inflatable restraint system.

It is well known to protect a vehicle occupant using a cushion or bag, e.g., an "airbag cushion," that is inflated or expanded with gas such as when the vehicle encounters sudden deceleration, such as in the event of a collision. In such systems, the airbag cushion is normally housed in an uninflated and folded condition to minimize space requirements. Upon actuation of the system, the cushion begins to be inflated, in a matter of no more than a few milliseconds, with gas produced or supplied by a device commonly referred to as an "inflator."

Many types of inflator devices have been disclosed in the art for the inflating of one or more inflatable restraint system airbag cushions. Prior art inflator devices include compressed stored gas inflators, pyrotechnic inflators and hybrid inflators. Unfortunately, each of these types of inflator devices has been subject to certain disadvantages such as one or more of having a greater than desired weight, requiring more than desired space or volume, producing undesired or nonpreferred combustion products in greater than desired amounts, and producing or emitting gases at a greater than desired temperature, for example. Further, in those inflator devices that rely upon the reaction of a gas generant material or fuel to produce or provide inflation gas, the cost of producing or supplying such gas generant material or fuel and associated inflator device may be greater than would otherwise be desired.

Thus, there remains a need and a demand for a gas generating device, particularly for application in an apparatus for inflating an inflatable device, and methods of inflation that more freely permit the use of lower cost reactant materials.

There has been and continues to be significant interest in gas generant compositions incorporation and use of ammonium nitrate. In particular, ammonium nitrate is a relatively low cost, readily available and generally high gas yield component material for inclusion in such compositions.

Unfortunately, the general incorporation and use of ammonium nitrate in pyrotechnic gas generant formulations have generally been subject to certain difficulties. For example, ammonium nitrate-containing pyrotechnic gas generant formulations have commonly been subject to phase or other changes in crystalline structure such as may be associated with volumetric expansion such as may occur during temperature cycling over the normally expected or anticipated range of storage conditions, e.g., temperatures of about −40° C. to about 110° C. Such changes of form or structure may result in physical degradation of such gas generant formulation forms such as when such a gas generant formulation has been shaped or formed into tablets, wafers or other selected shape or form. Further, such changes, even when relatively minute, can strongly influence the physical properties of a corresponding gas generant material and, in turn, strongly affect the burn rate of the generant material. Unless checked, such changes in ammonium nitrate structure may result in such performance variations in the gas generant materials incorporating such ammonium nitrate as to render such gas generant materials unacceptable for typical inflatable restraint system applications.

In view of the above, there is a need and a demand for a gas generating device, an apparatus for inflating an inflatable device and a method for inflation that enhance the likelihood of greater or more widespread use of reactant materials such as ammonium nitrate.

SUMMARY OF THE INVENTION

A general object of the invention is to provide an improved gas generation or inflation device and method for inflating an inflatable safety device.

A more specific objective of the invention is to overcome one or more of the problems described above.

The general object of the invention can be attained, at least in part, through an apparatus for inflating an inflatable safety restraint cushion and which apparatus includes a first container containing a supply of elemental carbon. The apparatus also includes a first chamber having contents including a supply of oxidant source material, wherein the oxidant source material comprises a supply of nitrous oxide. The apparatus further includes a container opener, an initiator device and a diffuser assembly. The chamber opener is effective upon actuation to open the first container and place at least a portion of the supply of elemental carbon in reaction communication with at least a portion the first chamber contents. The initiator device is effective to initiate reaction between at least a portion of the supply of elemental carbon and at least a portion the first chamber contents to form a gaseous inflation medium. The diffuser assembly includes at least one outlet opening for directing gaseous inflation medium discharged from the first chamber to the inflatable device.

The prior art has generally failed to provide an inflator device and inflation method that permits and facilitates the use of low cost fuel materials, such as elemental carbon, in gas generation or production and, in particular, for gas generation or production for use in the inflation of inflatable restraint system airbag cushions. The prior art also has generally failed to provide an inflator device and inflation method that may desirably facilitate or otherwise more easily permit the advantageous use of compounds such as ammonium nitrate without incurring undesired complications such as described above relating to form and structure on the ammonium nitrate and the resulting performance characteristics thereof.

The invention further comprehends an apparatus for inflating an inflatable safety restraint cushion. In accordance with one preferred embodiment of the invention, such an apparatus includes a first container having contents including a supply of elemental carbon, a supply of ammonium nitrate and a supply of boron potassium nitrate. The apparatus also includes a first chamber having contents including a supply of nitrous oxide and a supply of carbon dioxide; wherein the first chamber contents are contained therewithin in a static state in an at least partially liquified form. The apparatus further includes a container opener effective upon actuation to open the first container and place at least a portion of the supply of elemental carbon in reaction communication with at least a portion the first chamber contents. Also, the apparatus includes an initiator device effective to initiate reaction between at least a portion of the supply of elemental carbon and at least a portion the first chamber contents to form a gaseous inflation medium and a diffuser assembly including at least one outlet opening for directing gaseous inflation medium discharged from the first chamber to the inflatable device.

The invention still further comprehends a method of or for inflating an inflatable safety restraint cushion. In accordance with one such preferred embodiment of the invention, such method involves reacting elemental carbon with an oxidant within an inflator device to form a gaseous inflation medium and then directing at least a portion of the gaseous inflation medium flowing through at least one outlet opening out of the inflator device.

As used herein, the references to "elemental carbon" are to be understood to refer to generally refer to carbon in an uncombined form. It will be appreciated that elemental carbon in accordance with the invention may contain or include small or minor amounts of impurities, such as are known or commonly associated with carbon.

Other objects and advantages will be apparent to those skilled in the art from the following detailed description taken in conjunction with the appended claims and drawings.

DETAILED DESCRIPTION OF THE INVENTION

Figure 1:
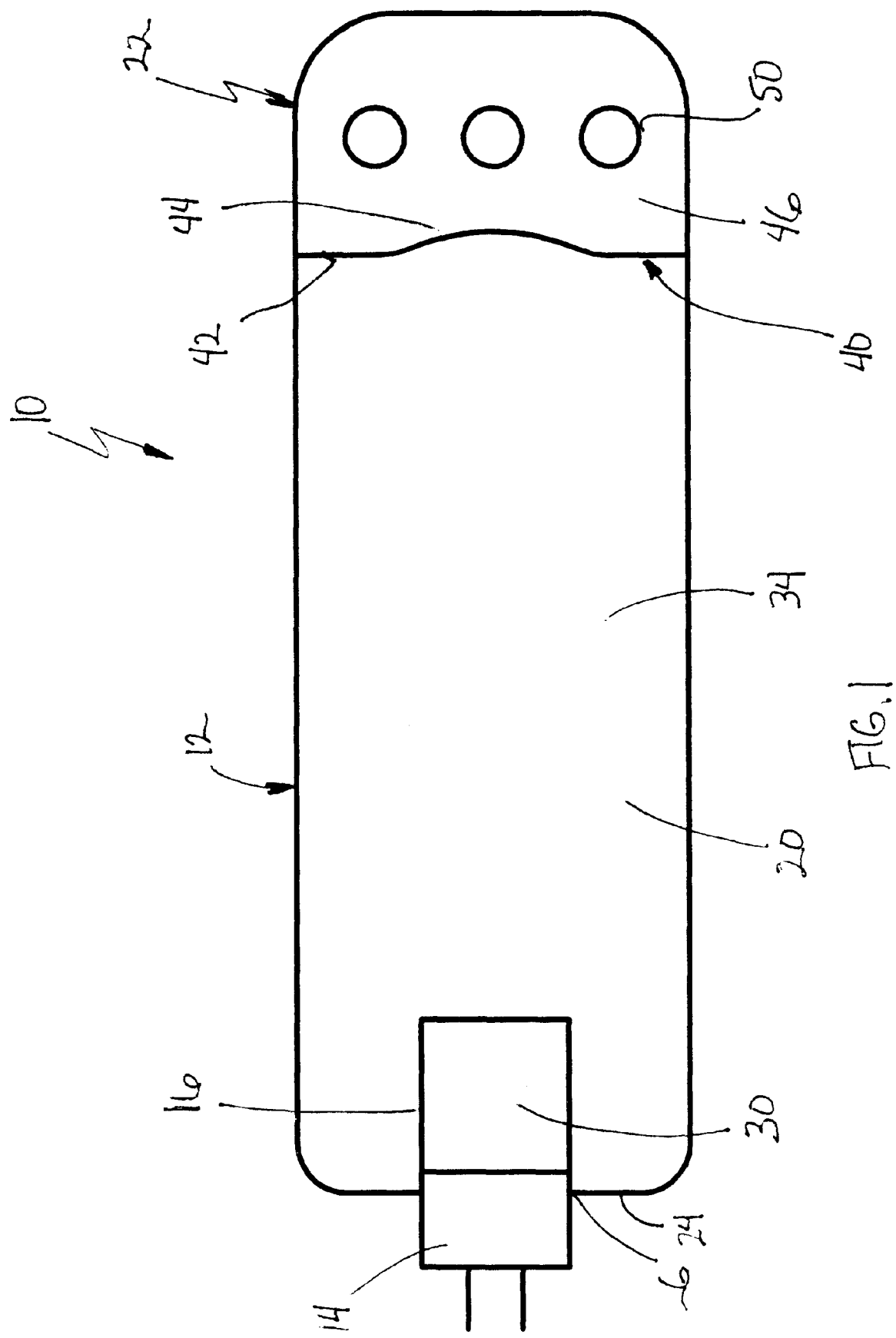
FIG. 1 is a simplified, partially in section, schematic drawing of an airbag inflator assembly in accordance with one embodiment of the invention.

The present invention may be embodied in a variety of different structures. As representative, FIG. 1 illustrates the present invention as embodied in a gas generating device, generally designated by the reference numeral 10. While such gas generating devices may find various uses, the invention is believed to have particular utility for generating gas such as may be used in the inflation of an inflatable vehicle occupant restraint, e.g., an inflatable airbag cushion, not shown. As is known and upon proper actuation, such inflatable vehicle occupant restraints are typically inflated by a flow of an inflation fluid, e.g., gas, from an inflator assembly to restrain movement of an occupant of the vehicle. In practice, it is common that the inflatable vehicle occupant restraints be designed to inflate into a location within the vehicle between the occupant and certain parts of the vehicle interior, such as the doors, steering wheel, instrument panel or the like, to prevent or avoid the occupant from forcibly striking such parts of the vehicle interior. As identified above, such gas generating devices are commonly referred to as inflator.

As will be described in greater detail below, inflator devices in accordance with the invention desirably generate inflation gas via the reaction of at least a portion of a supply of elemental carbon stored, contained or otherwise provided therein. Further, while the invention is described hereinafter with particular reference to an inflator for an airbag assembly such as for use in various automotive vehicles including vans, pick-up trucks, and particularly automobiles, it is to be understood that the invention also has applicability not only with various types or kinds of airbag module assemblies for automotive vehicles including driver side, passenger side, side impact, curtain and carpet airbag assemblies, for example, but also with other types of vehicles including, for example, airplanes, as well as possibly other inflation applications.

Returning to the FIG. 1, the inflator 10 is an assembly that comprises a pressure vessel 12. The inflator assembly 10 includes an initiator device 14, a first container 16, a first chamber 20, and a diffuser assembly 22. The inflator 10 has a first end wall 24 that has an opening 26 therein. In the inflator assembly 10, the initiator device 14 is desirably attached through the opening 26 in sealing relation, such as via a weld, crimp or other suitable hermetic seal.

In such an assembly, the initiator device can include any suitable type of initiator means including: bridgewire, spark-discharge, heated or exploding wire or foil, through bulkhead (e.g., an initiator that discharges through a bulkhead such as in the form of a metal hermetic seal), for example, and may, if desired, optionally contain a desired load of a pyrotechnic charge. As will be appreciated, in certain preferred embodiments of the invention, the exclusion or minimization of such pyrotechnic material may be desired or required in certain applications such as so minimize or avoid particulate formation or introduction into the inflation fluid of the inflator device. As will be described in greater detail below, the inclusion or presence of such pyrotechnic material may, however, be desired in certain alternative preferred embodiments of the invention such as to more easily or readily provide a large heat input for associated reaction processing. In view thereof, as pyrotechnic charge-containing initiators can typically more easily produce such relatively large heat inputs from a relatively small sized initiator device, the practice of the invention with such initiators can be particularly advantageous. An initiator may provide such a large heat input through the inclusion therewith or therein of an additional quantity of pyrotechnic, i.e., a "booster charge," such as boron potassium nitrate ($BKNO_3$), for example.

The first container 16 is generally situated adjacent the initiator device 14 in discharge communication therewith. In the illustrated static, at rest or "normal" condition or state, the first container 16 is closed and has contents, designated by the reference numeral 30. The first container contents 30 include, in accordance with a preferred embodiment of the invention and as described in greater detail below, a quantity or supply of fuel material in the form of elemental carbon.

While practice of the invention in its simpler forms does not require that the first container contain or include materials other than elemental carbon, in accordance with certain preferred embodiments of the invention, the first container will desirably contain or include additional materials such as may assist or contribute to improving or facilitating performance of the inflator. Thus, in accordance with one preferred embodiment, the first container contents 30 may additionally include a quantity of ammonium nitrate, as detailed below. Alternatively or in addition, the first container 16 may, if desired, additionally contain or include an energetic or booster material such as composed of boron potassium nitrate ($BKNO_3$), for example. As will be appreciated, the presence or inclusion of an energetic or booster material such as composed of $BKNO_3$ may be desired where, for example, the initiator device 14 does not itself provide sufficient energy or heat to drive the desired reaction(s), such as described in greater detail below, to the degree desired. Thus, in accordance with certain preferred embodiments of the invention, the first container contents 30 include carbon and ammonium nitrate in the following mass basis percentages: generally 10–100% C and 0–90% ammonium nitrate; preferably 30–80% C and 20–70% ammonium nitrate and, more preferably, 40–50% C and 50–60% ammonium nitrate. Where the first container contents include a booster (e.g., $BKNO_3$), the first container contents 30 can desirably include carbon and ammonium nitrate mixture, as described above, and booster material in the following mass basis percentages: generally 20–100% carbon/ammonium nitrate and 0–80% booster; preferably 50–90% carbon/ammonium nitrate and 10–50% booster and, more preferably, 60–80% carbon/ammonium nitrate and 20–40% booster.

In accordance with certain preferred embodiments of the invention, the first container 16 may additionally contain a supply of powdered metal such as magnesium or aluminum, for example, or a metal hydride or the like, such as to increase the energy content therewithin contained and such as may serve to increase or improve reaction of such contents upon release and contact with the contents of the first chamber 20.

In the illustrated static or at rest condition for the inflator 10, the first chamber 20 is closed and has contents, designated by the reference numeral 34, therein contained. The first chamber contents 34 desirably include a quantity of pressurized stored gas including a supply of oxidant source material composed, at least in part, by a supply of nitrous oxide. As detailed below, oxidant material derived from the oxidant source material may appropriately react with at least a portion of the elemental carbon fuel material to form or produce a supply of gaseous products such as may be used in the inflation of an associated inflatable airbag cushion.

In accordance with certain preferred embodiments of the invention, the first chamber contents 34 may desirably be composed a single oxidant source material, i.e., nitrous oxide, or be composed of nitrous oxide combined or mix with one or more other oxidant or oxidant source material and/or one or more materials that are typically inert under the conditions of interest. For example, suitable additional oxidant materials for inclusion in the first chamber contents 34 may include oxygen, for example. Further, the first chamber contents 34 may, if desired, additionally contain or include one or more inert materials such as argon, carbon dioxide or helium, for example. The first chamber contents 34, in accordance with one preferred embodiment of the invention, consist essentially of an at least partially gaseous mixture of nitrous oxide and carbon dioxide.

Those skilled in the art and guided by the teachings herein provided will further appreciate that such pressurized or compressed contents can appropriately be stored or contained in the first chamber 20 in a gaseous, liquid or multi-phase form (i.e., partially gaseous and partially liquid mixture). As will be appreciated, the premium on size generally placed on modern vehicle design, generally results in a preference for smaller sized airbag inflators. In view thereof and the fact that the densities for such materials are significantly greater when in a liquid, rather than gaseous form, storage of such oxidant compressed gas materials at least partially in a liquid form may be preferred.

Thus, in accordance with one preferred embodiment of the invention, the first chamber contents 34 contain an at least partially liquified mixture of nitrous oxide ($N_2O$) and carbon dioxide ($CO_2$). In particular, those inflator embodiments wherein the first chamber contents 34 include 5 to 95% $N_2O$ with the balance being $CO_2$ are generally preferred; those inflator embodiments wherein the first chamber contents 34 include 15 to 85% $N_2O$ with the balance being $CO_2$ are generally more preferred; and those inflator embodiments wherein the first chamber contents 34 include 20 to 60% $N_2O$ with the balance being $CO_2$ are generally even more preferred, where the percentages are in terms of molar percent.

Further, a leak trace material such as helium (He) can be added if necessary or desired for example for leak detection purposes, as is known in the art. In general, in those embodiments wherein helium is added it is generally preferred that such helium content be added or present in a relative amount of about 10 to 15 molar percent of the entire mixture or chamber contents.

In those inflator embodiments wherein the first chamber contents 34 include $N_2O$, $CO_2$ and He, generally preferred content ranges for use in the practice of the invention include 5 to 85% $N_2O$, 5 to 85% $CO_2$ and 10–15% He; more preferably, 15 to 75% $N_2O$, 15 to 75% $CO_2$ and 10–15% He; and, even more preferably 20 to 60% $N_2O$, 30 to 70% $CO_2$ and 10–15% He, with such percentages being on a molar basis.

The first chamber 20 is closed and the contents 34 thereof appropriately held therewithin from fluid communication with the diffuser assembly 20 by means of a closure 40 such as composed of a wall 42 with a burst or rupture disk 44. Those skilled in the art and guided by the teachings herein provided will appreciate that closures of other suitable types or forms can desirably be used in the practice of the invention and the broader practice of the invention is not necessarily limited to particular or specific types or forms of closures.

The diffuser assembly 20 defines a diffuser chamber 46 and includes a plurality of diffuser orifices or outlet openings 50 for dispensing inflation gas from the inflator 10 into an associated inflatable airbag cushion (not shown).

While the broader practice of the invention is not necessarily limited to the specific or particular form of elemental carbon contained within the subject inflator device, the use of a finely powdered form of elemental carbon may assist in improving the reactability of the carbon and is thus currently believed preferred. In general, the invention can desirably be practiced employing elemental carbon in allotropic forms, e.g., graphite, and in amorphous (e.g., non-crystalline) forms such as charcoal or coal, for example. It is known to form activated carbon via various processing techniques and such as may serve to remove various impurities from the carbon. In general, activated carbon is a preferred material for use in the practice of the invention.

In accordance with one preferred embodiment of the invention, carbon may be oxidized directly in a nitrous oxide-based system according to the following reaction:

$$C + 2N_2O \rightleftharpoons CO_2 + 2N_2 \qquad (1)$$

Thus, the invention in one of its simpler forms relies on the reaction of elemental carbon with nitrous oxide to form or produce inflation gas such as may be used in the inflation of an associated inflatable device.

Elemental carbon, however, also reacts with water via the following relatively high gas producing reaction:

$$C + H_2O \rightleftharpoons CO + H_2 \qquad (2)$$

Both carbon monoxide and molecular hydrogen are potential fuels to be oxidized by or with nitrous oxide.

As identified in the above-identified parent patent application, Ser. No. 09/836,514, filed on Apr. 17, 2001, ammonium nitrate, in addition to having a relatively low cost, ready availability and high gas yield, will at high temperatures, e.g., temperatures of about 212° C. or more, decompose to produce water and additional nitrous oxide in accordance with the following idealized reaction:

$$NH_4NO_3 \leftrightarrows N_2O + 2H_2O \quad (3)$$

As will be appreciated, such reaction has a relatively high molar ratio of products to reactants (3:1). Further, in such application as in the subject invention, the phase stability of an included ammonium nitrate is generally of no import as the ammonium nitrate is simply being decomposed.

Further, carbon monoxide, such as formed upon reaction of carbon with water, may react vigorously with nitrous oxide, in accordance with the following reaction:

$$CO + N_2O \leftrightarrows CO_2 + N_2 \quad (4)$$

In view of the above reactions (1) through (4), it can be seen that an elemental carbon-based system, particularly in combination with nitrous oxide and especially in further combination with ammonium nitrate, can be particularly attractive in inflatable restraint system inflator device applications.

Further, those skilled in the art and guided by the teachings herein provided will appreciate that inflator performance parameters such as rise rate, internal pressure and peak output pressure, for example, can desirably be controlled, at least in part, via design parameters such as particle size and load of elemental carbon therein contained, as well as the specific carbon containment method used and the presence or inclusion as well as amount and form of any booster material and ammonium nitrate, for example.

In operation such as upon the sensing of the occurrence of a collision, an electrical signal is sent to the initiator device 14. The initiator device 14 functions and when it is a pyrotechnic-containing initiator, discharges high temperature combustion products into the first container 16 and, more specifically, the contents 30 thereof and such as to cause the rupture or otherwise opening of the container 16 such as to place the container contents 30 in communication with the chamber contents 34.

At least a portion of the elemental carbon originally contained within the first container 16 will react with nitrous oxide originally contained within the first chamber 20 or otherwise react to form or produce gaseous inflation products. Additional gaseous inflation products may be formed or produced via the inclusion or presence of ammonium nitrate, water, and carbon dioxide, for example, such as may be supplied, formed or produced within certain preferred embodiments of inflator devices in accordance with the invention, as described above.

When the gas pressure within the first chamber 20 exceeds the structural capability of the burst disk 44, the disk ruptures of otherwise permits the passage of the inflation gas into the diffuser chamber 46 and thus allows this gaseous inflation medium to exit through the diffuser orifices or outlet openings 50 into an associated airbag assembly.

The present invention is described in further detail in connection with the following examples which illustrate or simulate various aspects involved in the practice of the invention. It is to be understood that all changes that come within the spirit of the invention are desired to be protected and thus the invention is not to be construed as limited by these examples.

EXAMPLE

In this Example, a test inflator similar in design to the inflator 10, as shown in FIG. 1, and sized for a passenger inflatable restraint device was used.

The test inflator had an internal volume of 266.3 cc and contained a 150 gram load of a 60/40 (molar) nitrous oxide and carbon dioxide combination. The initiator contained 460 mg of titanium hydride potassium perchlorate (THPP). The container "16" contained: 1.0 gram of carbon (average particle size of about 290 $\mu$m diameter), 6.7 grams of ammonium nitrate (average particle size of about 1000 $\mu$m diameter) and 3.0 grams of $BKNO_3$ (average particle size of about 50 $\mu$m diameter). The container contents has an approximate bulk density of 0.59 g/cc. The container "16" was hermetically sealed and about 70% filled with material (e.g., the container had about 30% void space). The test inflator has a total outlet opening area of 0.582 cm$^2$.

The test inflator was fired into a test tank having an internal volume of 100 liters.

Figure 2:
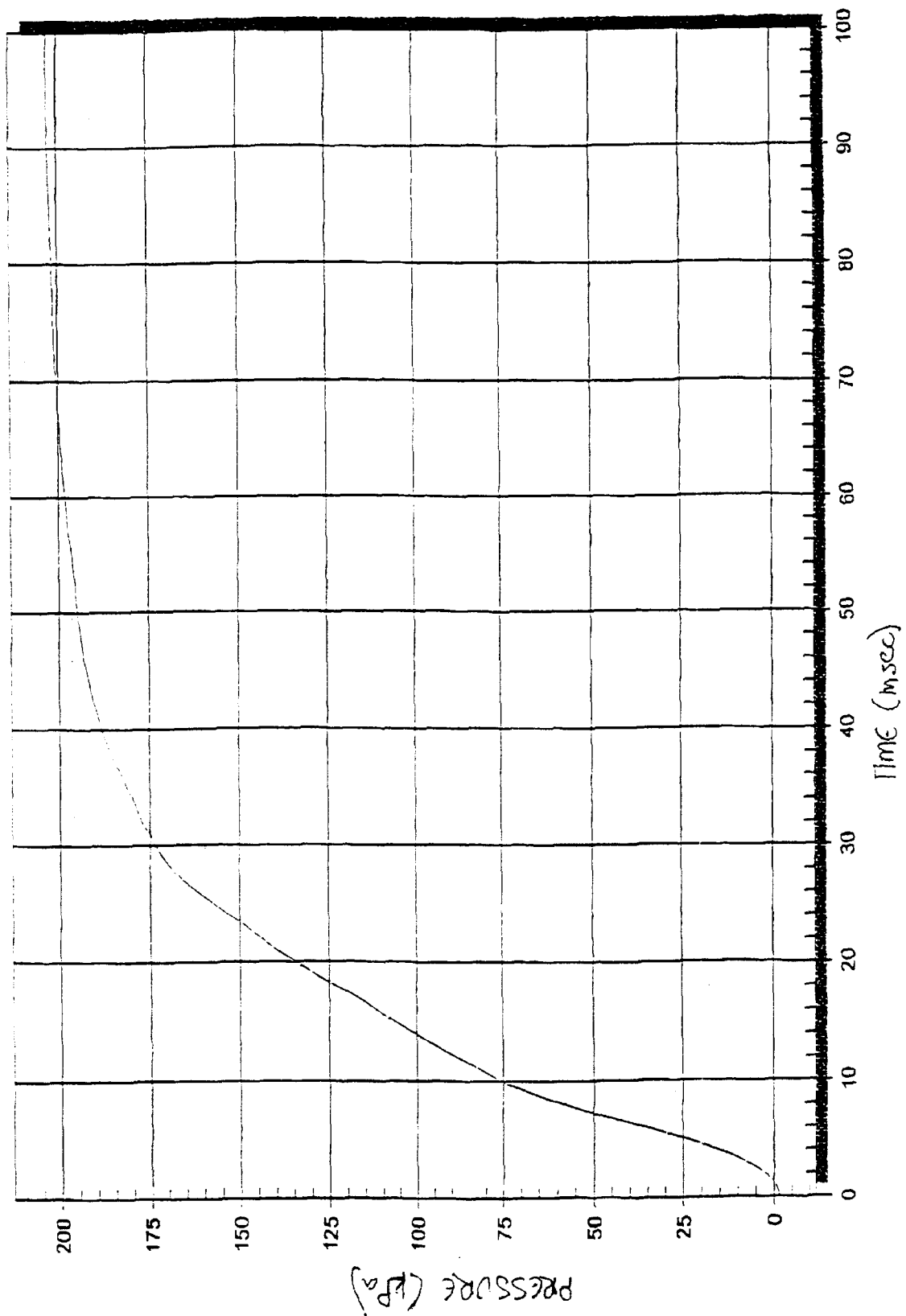
FIGS. 2 and 3 are graphical depictions of tank pressure and internal pressure, each as a function of time, realized for the test inflator of Example 1.
Figure 3:
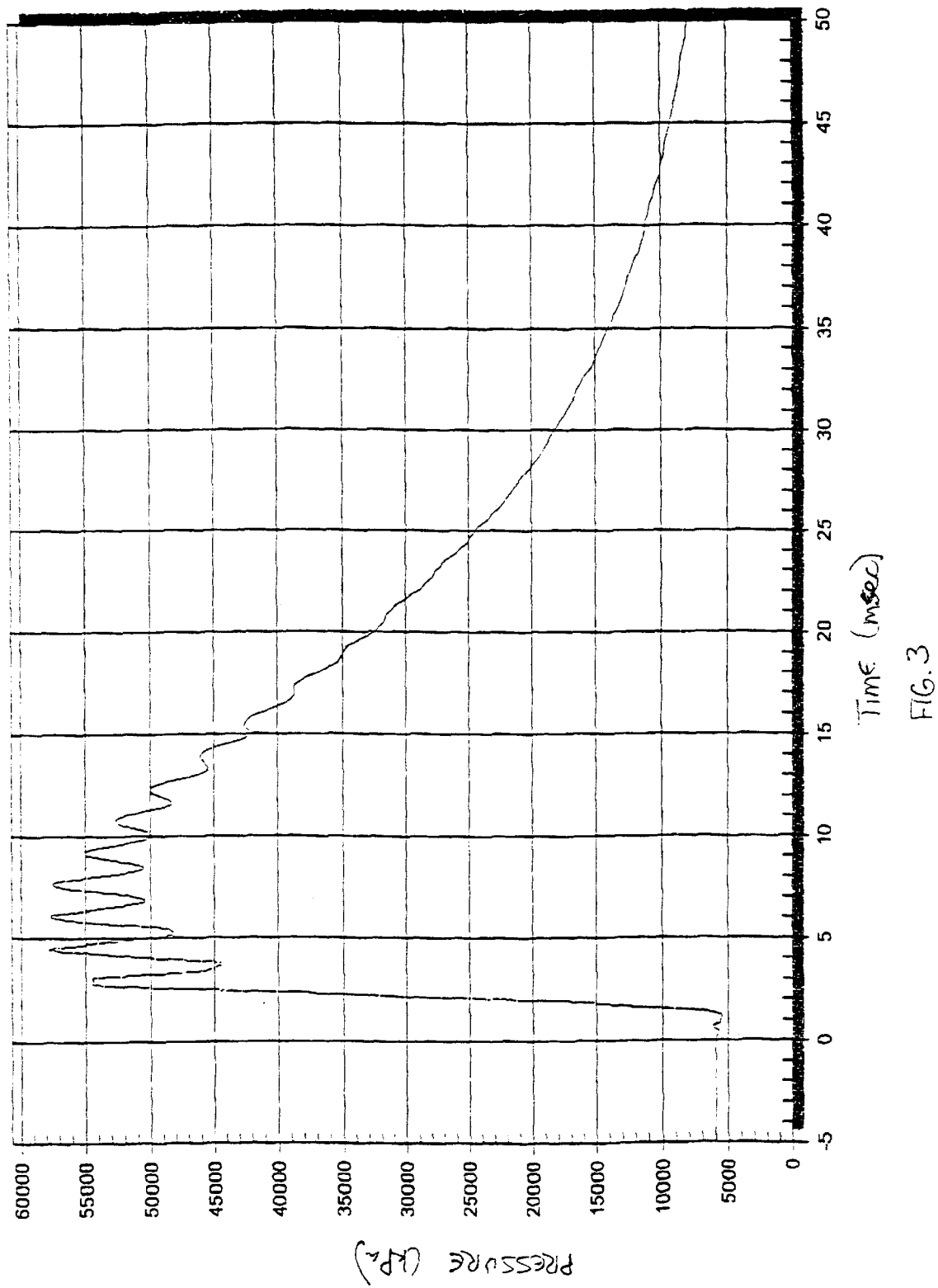

The test inflator produced about 4 moles of gas output. FIGS. 2 and 3 are graphical depictions of tank pressure and internal pressure, each as a function of time, realized for the test inflator of Example 1.

Results

The tank pressure and internal pressure, each as a function of time, shown in FIGS. 2 and 3 are indicative of an inflator employed for passenger applications. These results indicate that even though certain design parameters such as elemental carbon particle size, chamber and container content compositions and loads may not yet be fully optimized, the invention has wide potential application and utility.

Thus, the invention provides an inflator device and inflation method that permits and facilitates the use of low cost fuel materials, such as elemental carbon, in gas generation or production and, in particular, for gas generation or production for use in the inflation of inflatable restraint system airbag cushions. The invention also provides an inflator device and inflation method that desirably facilitates or otherwise more easily permits the advantageous use of compounds such as ammonium nitrate without incurring undesired complications such as described above relating to form and structure on the ammonium nitrate and the resulting performance characteristics thereof.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An apparatus for inflating an inflatable safety restraint cushion, the apparatus comprising:
   a first container containing a supply of elemental carbon;
   a first chamber having contents including a supply of oxidant source material, wherein the oxidant source material comprises a supply of nitrous oxide;
   a container opener effective upon actuation to open the first container and place at least a portion of the supply of elemental carbon in reaction communication with at least a portion the first chamber contents;

an initiator device effective to initiate reaction between at least a portion of the supply of elemental carbon and at least a portion the first chamber contents to form a gaseous inflation medium; and a diffuser assembly including at least one outlet opening for directing gaseous inflation medium discharged from the first chamber to the inflatable safety restraint cushion.

2. The apparatus of claim 1 wherein, in a preactuation static state, at least a portion of the supply of nitrous oxide is contained within the first chamber in a liquid form.

3. The apparatus of claim 1 wherein the first chamber contents additionally comprise a quantity of carbon dioxide.

4. The apparatus of claim 3 wherein, in a preactuation static state, at least a portion of the supply of nitrous oxide and at least a portion of the quantity of carbon dioxide is each contained within the first chamber in a liquid form.

5. The apparatus of claim 1 wherein the first chamber contents consist essentially of a mixture of nitrous oxide and carbon dioxide.

6. The apparatus of claim 5 wherein the first chamber contents include 20 to 60 molar % nitrous oxide.

7. The apparatus of claim 1 wherein the first container additionally contains a supply of ammonium nitrate.

8. The apparatus of claim 7 wherein the first container contains a mixture comprising elemental carbon and ammonium nitrate composed of 30–80 mass % elemental C and 20–70 mass % ammonium nitrate.

9. The apparatus of claim 7 wherein the first container additionally contains a supply of booster material.

10. The apparatus of claim 9 wherein the first container contains a supply of the booster material boron potassium nitrate.

11. The apparatus of claim 9 wherein the first container additionally contains a supply of a powdered, energy-contributing metal.

12. The apparatus of claim 11 wherein the powdered, energy-contributing metal is magnesium.

13. The apparatus of claim 1 wherein the elemental carbon comprises activated carbon.

14. An apparatus for inflating an inflatable safety restraint cushion, the apparatus comprising:

a first container having contents including a supply of elemental carbon, a supply of ammonium nitrate and a supply of boron potassium nitrate;

a first chamber having contents including a supply of nitrous oxide and a supply of carbon dioxide; wherein the first chamber contents are contained therewithin in a static state in an at least partially liquified form;

a container opener effective upon actuation to open the first container and place at least a portion of the supply of elemental carbon in reaction communication with at least a portion the first chamber contents;

an initiator device effective to initiate reaction between at least a portion of the supply of elemental carbon and at least a portion the first chamber contents to form a gaseous inflation medium; and a diffuser assembly including at least one outlet opening for directing gaseous inflation medium discharged from the first chamber to the inflatable safety restraint cushion.

15. The apparatus of claim 14 wherein the elemental carbon comprises activated carbon.

16. The apparatus of claim 14 wherein the first container additionally contains a supply of a powdered, energy-contributing metal.

17. The apparatus of claim 16 wherein the powdered, energy-contributing metal is magnesium.

18. The apparatus of claim 14 wherein the first chamber contents include 20 to 60 molar % nitrous oxide.

19. An apparatus for inflating an inflatable safety restraint cushion, the apparatus comprising:

a first container containing a supply of elemental carbon, a supply of ammonium nitrate, a supply of boron potassium nitrate and a supply of powdered magnesium metal;

a first chamber having contents including a supply of oxidant source material, wherein the oxidant source material comprises a supply of nitrous oxide;

a container opener effective upon actuation to open the first container and place at least a portion of the supply of elemental carbon in reaction communication with at least a portion the first chamber contents;

an initiator device effective to initiate reaction between at least a portion of the supply of elemental carbon and at least a portion the first chamber contents to form a gaseous inflation medium; and a diffuser assembly including at least one outlet opening for directing gaseous inflation medium discharged from the first chamber to the inflatable safety restraint cushion.

20. The apparatus of claim 19 wherein the first chamber contents additionally comprise a quantity of carbon dioxide.

* * * * *